No. 773,065. PATENTED OCT. 25, 1904.
J. L. DICKEY.
ELECTRICAL RAILWAY SIGNAL.
APPLICATION FILED AUG. 29, 1902.
NO MODEL. 2 SHEETS—SHEET 1.
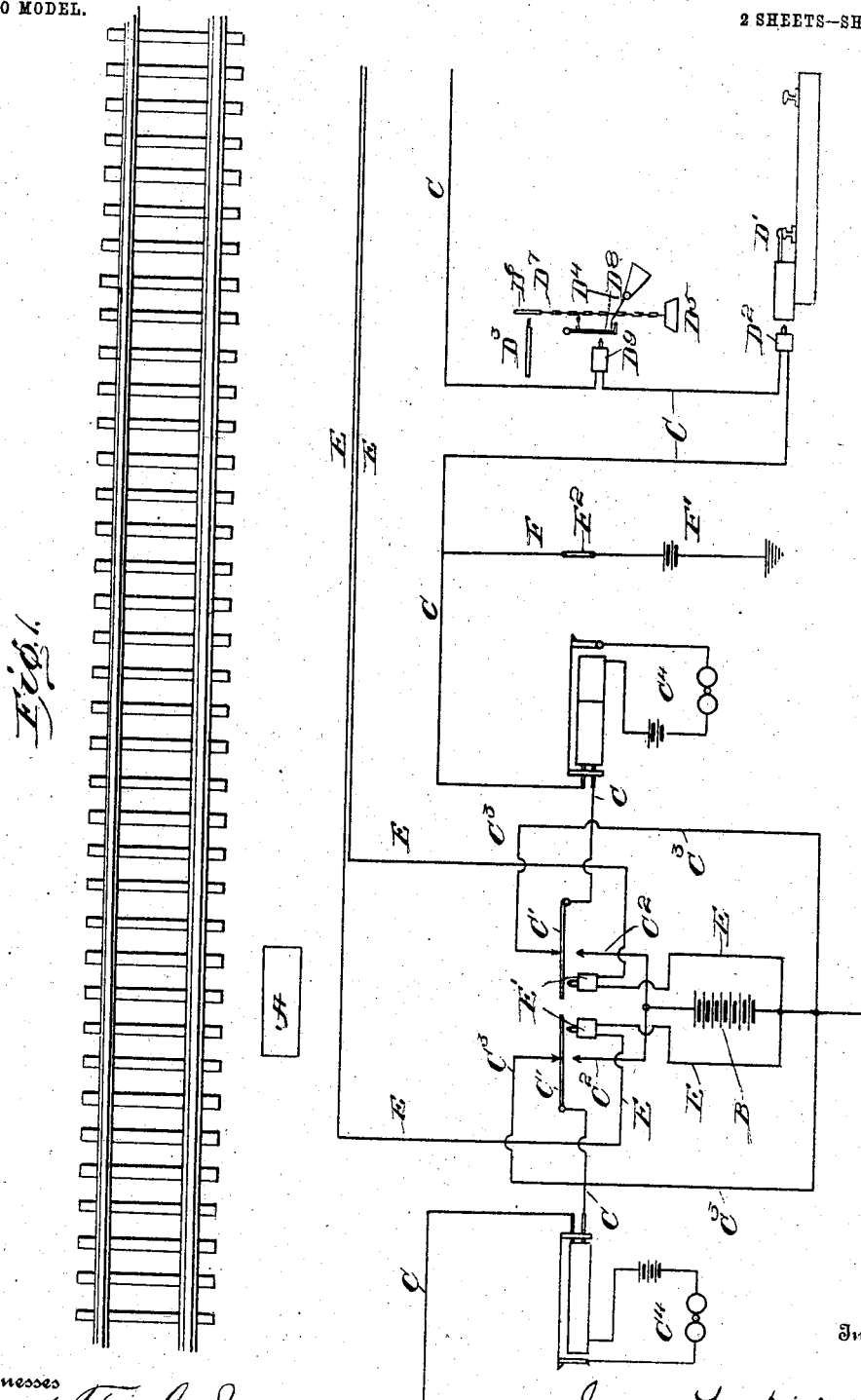

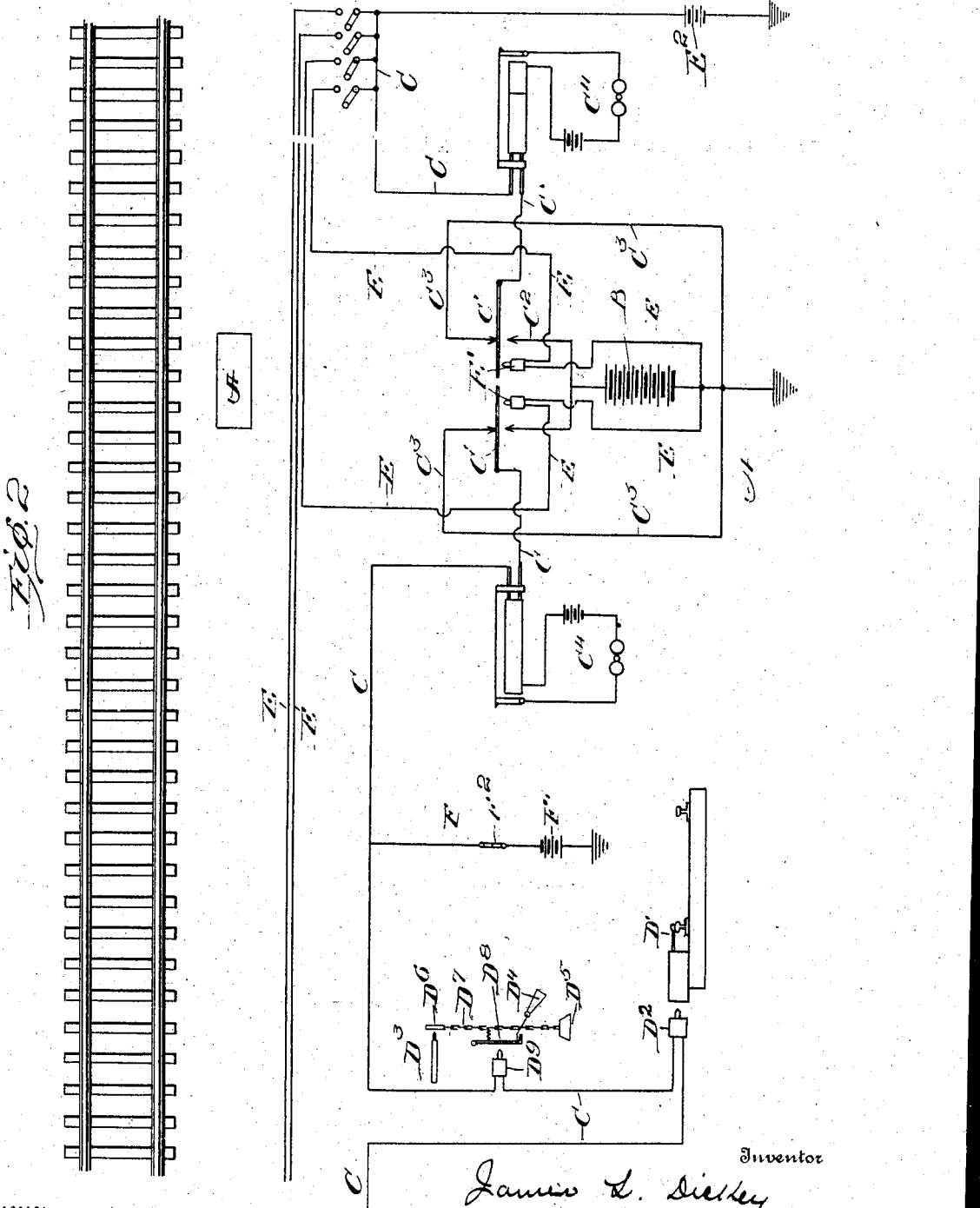

No. 773,065. Patented October 25, 1904.

UNITED STATES PATENT OFFICE.

JAMES L. DICKEY, OF ATLANTA, GEORGIA.

ELECTRICAL RAILWAY-SIGNAL.

SPECIFICATION forming part of Letters Patent No. 773,065, dated October 25, 1904.

Application filed August 29, 1902. Serial No. 121,498. (No model.)

*To all whom it may concern:*

Be it known that I, JAMES L. DICKEY, a citizen of the United States, and a resident of Atlanta, in the county of Fulton and State of Georgia, have invented certain new and useful Improvements in Electrical Railway-Signals, of which the following is a full, clear, and exact description, such as will enable those skilled in the art to which it appertains to make and use the same, reference being had to the accompanying drawings, forming a part of this specification.

The invention has for its object the provision of a railway-signal system whereby a series of signals can be operated along a particular section of railroad from either end of said section or from a distant point.

It consists in the novel construction, combination, and arrangement of parts, such as will be hereinafter fully described, pointed out in the appended claims, and illustrated in the accompanying drawings.

In the drawings, in which similar reference characters designate corresponding parts, Figures 1 and 2, which are complements of each other, are diagrammatic views illustrating a portion of a railway system embodying the invention.

The drawings show in conventional form a section of railway-track with the signals placed at intervals along the side of the same, together with the circuits and sources of electricity for operating the signals and the switches for controlling the circuits.

The line of railway is of the usual construction and for the purposes of this invention is divided into sections with a station A at each end of each section. At each station is a source of electricity B, connected with the ground in the usual manner. A circuit C extends along each section between the stations at the ends thereof. At each end of the circuit C is a switch C', by means of which the circuit can be controlled at either station. A branch wire C² leads from the source of electricity at each station to the switch C', and also a second branch wire C³ leads from each switch to the ground. The normal position of the switch at each station is such as to connect the circuit C with the branch wires C³ at its ends. By moving the switch at either end to connect the circuit C with the branch C², leading from the source of electricity, the said main circuit C can be energized. At each station is an operator's test and call signal C⁴ of the usual construction, electrically connected with the main circuit C and is operated by a current passing over the said main circuit.

Placed at intervals along each section is a series of signals electrically operated by currents passing over the circuit C. These signals may consist of any of the well-known devices in common use, such as semaphores, fuses, torpedo-placing devices, light, &c. They may be arranged in groups, as shown in the drawings, or they may be individual signals and they may be as numerous as the circumstances may require. In the present instance they consist of the torpedo-placing arm D', operated by the magnet D², and the fuse D³ and the semaphore D⁴, operated by the weight D⁵. The latter is connected with the igniting device D⁶ for lighting the fuse and also is connected with the arm of the semaphore by the chain D⁷. The weight is normally held in an elevated position by the catch D⁸. When the magnet D⁹, which is energized by the current passing through the circuit C, moves the catch, the weight is dropped, thereby operating the igniting device to light the fuse and also moves the semaphore to an exposed position. When the current is sent through the circuit C to energize the magnet D⁹, it also energizes the magnet D² to operate the torpedo-placing arm D'.

Ordinarily it is intended that the switch C' at each station for controlling its respective circuit C is to be operated manually. Provision is also made for operating it from a distant point. A circuit E, connected with a suitable source of electricity, as at E², leads from the distant point, where it is controlled by a suitable switch to the magnet E', located adjacent to the switch C'. The magnet when energized by the current passing through the circuit E will move the switch C' to close the circuit C through the branch wire C², and thereby operate the signals.

Intermediate of the ends of each section are auxiliary stations, from which a current may be sent through the circuit C to operate the signals. A branch circuit F leads from the circuit C to the source of electricity F', which is connected with the ground in the usual manner. The branch circuit is controlled by the switch F². As the ends of the circuit C are normally grounded, by closing the branch circuit F by means of the switch F² a current will be sent from the branch circuit through the main circuit C in both directions toward the ends of the main circuit, and thereby the signals will be operated.

The operation of the device is as follows: Normally the switches C' are in such position as to connect the main circuit C at its ends with the branch wires C³, leading to the ground, and consequently the main circuit is free from current while so connected. By means of the test-and-call signal C⁴ it can be ascertained in the usual manner if the circuit is in working order. It is assumed that an occasion arises requiring the use of the system—for an instance, two trains enter a section on the same track from opposite directions and only one of them has the right of way. The operator at the station where the train passes that has not the right of way, which he will know by his orders from the train despatcher, will immediately throw the switch C' at his station to connect the main circuit C with the branch wire C², leading from the source of electricity. This connection permits the current to pass through the main circuit C to operate the signals. As the latter are placed at intervals along the section, some of them will be quickly observed or noticed by the trainmen of both trains and the latter can be stopped.

Under certain exigencies it may be desirable to operate the signals from a distant point. For an instance, the train despatcher may give to two trains going in opposite directions the right of way over the same section at the same time. The operators at the ends of the section not being notified to the contrary would permit both trains to pass onto the section. The train despatcher would probably discover this immediately that the trains passed onto the section and could signal to the trainmen on both trains by closing the circuit E. This would energize the magnet E', which would move the switch C' to connect the wire C with the branch circuit C². This would operate the signals, as the circuit to a source of electricity would be completed.

When the occasion required, the signals could be operated at any one of the auxiliary stations placed intermediate of the ends of a section. By turning the switch F² and closing the branch circuit F the current could be sent from the source of electricity F' through the main circuit C in both directions from the branch circuit, as both ends of the main circuit are normally connected with the branch wires leading to the ground. The passing of the current would operate the signals to warn any trains that might be on the section.

Other instances showing the application of the system might be referred to. The hereinbefore-described embodiment of the invention is only one form of application. Others can be used which will also come within the scope of the invention.

Having thus described my invention, what I claim, and desire to secure by Letters Patent, is—

1. In a railway signal system, a line of railway divided into sections, a main circuit extending along each of said sections, signals placed at intervals along each of said sections and adapted to be operated by a current passing over said main circuit, a source of electricity, a branch wire leading from said source of electricity to said main circuit, a branch wire leading to the ground, a switch for connecting or disconnecting the main circuit with or from either of the branch wires, a magnet for operating said switch, and a circuit leading from a distant point to energize said magnet.

2. In a railway signal system, a line of railway divided into sections, a main circuit extending along each of said sections, signals placed at intervals along each of said sections and adapted to be operated by a current passing over said main circuit, a source of electricity, a branch wire leading from said source of electricity to said main circuit, a branch wire leading to the ground, a switch normally connecting the main circuit with the branch wire leading to the ground and arranged so as to connect the main circuit with the branch wire leading from the source of electricity when said switch is moved to break the connection between the main circuit and the branch wire leading to the ground, a branch circuit intermediate of the ends of the main circuit and connected with the same, a source of electricity connected with said branch circuit, and a switch controlling said branch circuit.

3. In a railway signal system, a line of railway divided into sections, a main circuit extending along each of said sections, signals placed at intervals along each of said sections and adapted to be operated by a current passing over said main circuit, a source of electricity, a branch wire leading from said source of electricity, a branch wire leading to the ground, a switch normally connecting the main circuit with the branch wire leading to the ground, a magnet for operating said switch to break the connection between the main circuit and the branch wire leading to the ground and to connect the main circuit with the branch wire leading from the source of electricity, and a circuit leading from a distant point for carrying a current to energize said magnet.

4. In a railway signal system, a line of railway divided into sections, a main circuit extending along each of said sections, signals placed at intervals along each of said sections and adapted to be operated by a current passing over said main circuit, a source of electricity, a branch wire leading from said source of electricity to said main circuit, a branch wire leading to the ground, a switch normally connecting the main circuit with the branch wire leading to the ground and arranged so as to connect the main circuit with the branch wire leading from the source of electricity when said switch is moved to break the connection between the main circuit and the branch wire leading to the ground, a branch circuit intermediate of the ends of the main circuit and connected with the same, a source of electricity connected with said branch circuit, and a switch controlling said branch circuit.

In testimony whereof I hereunto affix my signature in the presence of two witnesses.

JAMES L. DICKEY.

Witnesses:
E. M. ROBERTS,
S. L. JEFFERSEN.